United States Patent [19]

Tselikov et al.

[11] 3,739,624
[45] June 19, 1973

[54] PIPE BLANK CLAMP

[75] Inventors: Alexandr Ivanovich Tselikov; Vsevold Vladimirovich Nosal; Vadim Anatolievich Verderevsky, all of Moscow, U.S.S.R.

[73] Assignee: Vsesojuzny Naucho-Issledovatelsky and Proektnokonstruktorsky Institute Metallurgicheskogo Mashinostroeniya, Moscow, U.S.S.R.

[22] Filed: May 25, 1970

[21] Appl. No.: 40,131

[52] U.S. Cl. .................. 72/422, 269/224, 269/238
[51] Int. Cl. .............................................. B21b 25/00
[58] Field of Search .................... 72/422, 434, 125; 269/157, 158, 159, 160, 224, 216, 238

[56] References Cited
UNITED STATES PATENTS

| | | | |
|---|---|---|---|
| 1,298,656 | 4/1919 | Brinkman | 269/238 |
| 788,547 | 5/1905 | Miklebost et al. | 72/434 |
| 2,062,559 | 12/1936 | Coe | 72/208 |
| 3,034,778 | 5/1962 | Shaffer et al. | 269/224 |
| 2,841,196 | 7/1958 | Zazdrzyk | 269/224 |
| 2,447,562 | 8/1948 | Burri | 269/238 |
| 1,436,489 | 11/1922 | Ferrier | 72/125 |
| 1,383,839 | 7/1921 | Mueller et al. | 72/125 |

*Primary Examiner*—Lowell A. Larson
*Attorney*—Strauch, Nolan, Neale, Nies & Kurz

[57] ABSTRACT

A pipe blank clamp assembly, as part of a cold rolling, thin-walled pipe mill assembly, is located between the end of the blank feed chuck feed path and the input side of the mill working zone to clamp a pipe blank against axial displacement during certain intermediate mill operations. The clamp has a heavy body part which includes flanges to mount the clamp on a mill table and contains retainers for end bearings for various mill operating shafts. The heavy body part and a short arm of a long operating lever provide powerful jaws for gripping the exterior of a pipe blank. The operating lever is attached via a resilient lost motion spring connection to a solenoid operator.

15 Claims, 7 Drawing Figures

INVENTORS
ALEXANDR IVANOVICH TSELIKOV
VSEVOLD VLADIMISOVICH NOSAL
VADIM ANATOLIEVICH VERDEREVSKY

BY *Strauch, Nolan, Neale, Nies & Kurz*
ATTORNEYS

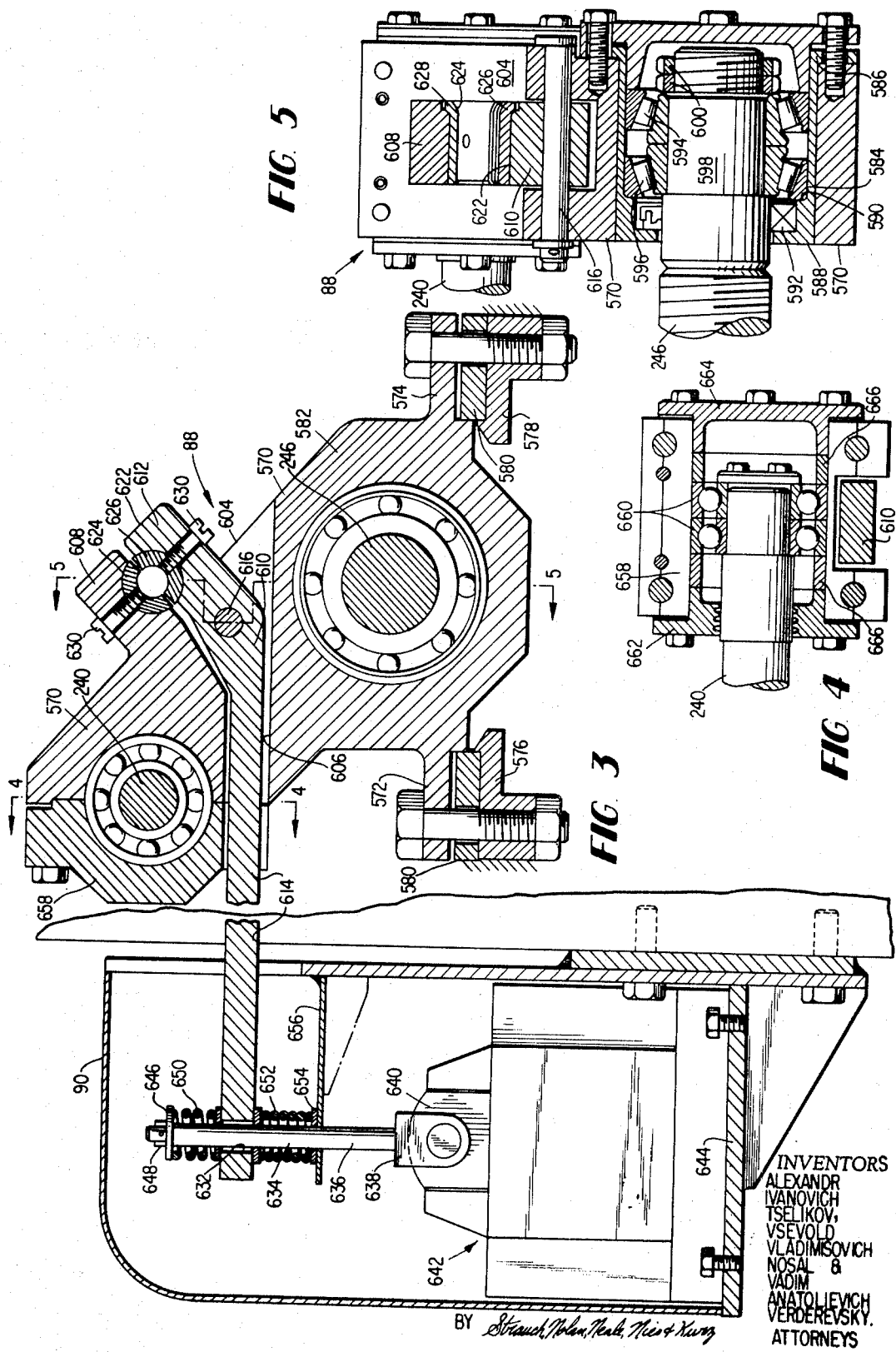

PIPE BLANK CLAMP

RELATED APPLICATION

This invention pertains to a pipe clamp assembly developed for use in a cold rolling thin-walled pipe mill, and is fully disclosed in applicant's co-pending application Ser. No. 529, on Method and Apparatus for Cold Rolling Thin Walled Pipe, filed on Jan. 5, 1970.

BACKGROUND OF THE INVENTION

Previously known cold rolling pipe mills have used two mandrel rod clamps to maintain the axial position of the mandrel rod during recharging of the pipe mill with a new pipe blank. In those mills the pipe blank was fed completely through the first open mandrel clamp to the second mandrel clamp (which would be closed at this stage). Next, the first mandrel clamp was closed on the mandrel rod and the second clamp opened whereupon the blank would be fed a further distance, usually greater than the length of the blank, until its trailing end reached a location where it could be clamped in the feeding and rotation chuck. Some prior art construction and methods of using pipe mill feed components are disclosed in the text "Cold Rolling Pipe Mills" by Shebakin, Yu. A. et al., Metalurgizdat 1966 published in the Soviet Union. Since that publication, various mill components, such as the pipe blank clamping mechanism reflected in the present invention, have undergone considerable improvements.

A primary object resides in the provision of an improved rugged but simple clamping assembly which can be used for clamping pipe blanks during mill operations.

A further object resides in provision of an improved pipe blank clamp which has a heavy base part including a fixed jaw means, a pivotable lever including a short arm serving as a shiftable jaw and a long arm which is an operator lever. The lever is pivoted in an opening through the base part with the two jaws in adjacent relationship so they can be pivotally shifted between clamped and unclamped condition. The lever is actuated by a motor device which can be an electric motor such as a solenoid mounted in fixed relationship to the base part. A reciprocable part of the motor is fastened to the long lever arm via a limited lost motion connection having resilient bias in both directions of movement.

A still further object, in conjunction with the preceding object, resides in providing the facing portions of said two jaw means with semi-cylindrical recesses and providing bronze half rings of complementary external shape to that of the recesses, which are secured in the jaw recesses. Each half ring has clamp surface contours shaped to conform to an outer circumference of a cylindrical workpiece to be clamped. A plurality of sets of half rings with similar external configurations to fit in the recesses and having different internal contours to enable clamping different sizes of cylindrical workpieces are contemplated.

Still another object resides in providing a pipe blank clamp, as discussed in the foregoing objects, for use in a pipe mill combination at the working end of a pipe mill. Such a clamp has heavy support flanges for securing the clamp to the mill frame and the heavy base also contains one or more retainer assemblies to conveniently mount the end bearings of mill operating shafts.

Further novel features and other objects of this invention will become apparent from the following detailed description, discussion and the appended claims taken in conjunction with the accompanying drawings:

BRIEF DESCRIPTION OF DRAWINGS

A preferred structural embodiment of this invention is disclosed in the accompanying drawings, in which:

FIG. 3 is a partially sectioned, enlarged rear view of the intermediate blank clamp and its operating mechanism; and FIGS. 4 and 5 are vertical section views, taken respectively on lines 4—4 and 5—5 of FIG. 3, illustrating details of the intermediate clamp mounting structure.

SPECIFIC DESCRIPTION

Figure 1A:
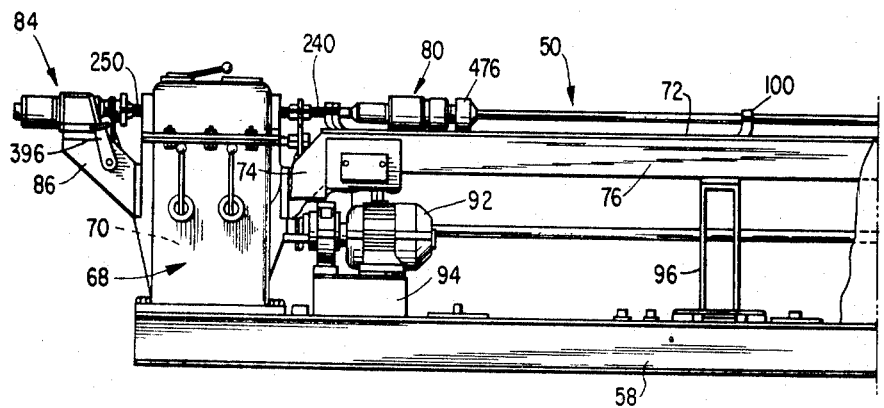
FIGS. 1a and 1b, viewed together will be referred to as FIG. 1 which illustrates, in side elevation, a pipe mill incorporating an intermediate clamp made in accord with this invention and used to clamp a pipe blank and an associated internal mandrel rod.
Figure 2A:
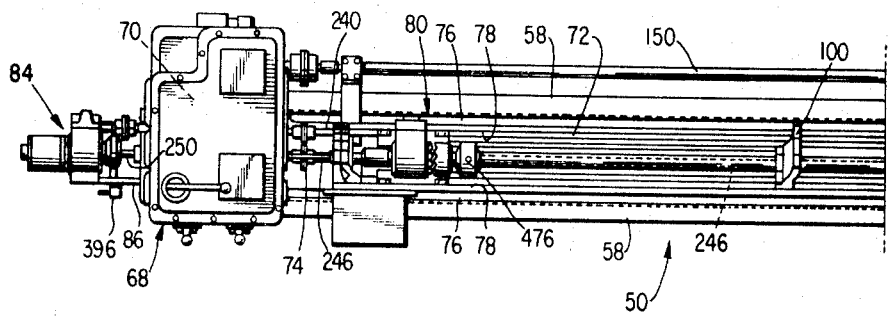
FIGS. 2a and 2b, also viewed together will be referred to as FIG. 2, illustrating in plan view the pipe mill seen in FIGS. 1a and 1b.
Figure 1B:
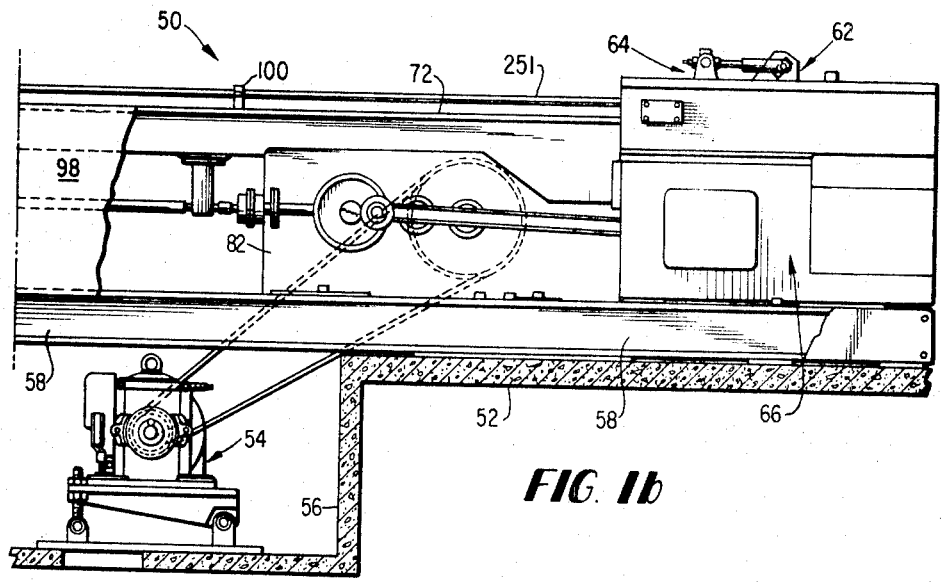
Figure 2B:
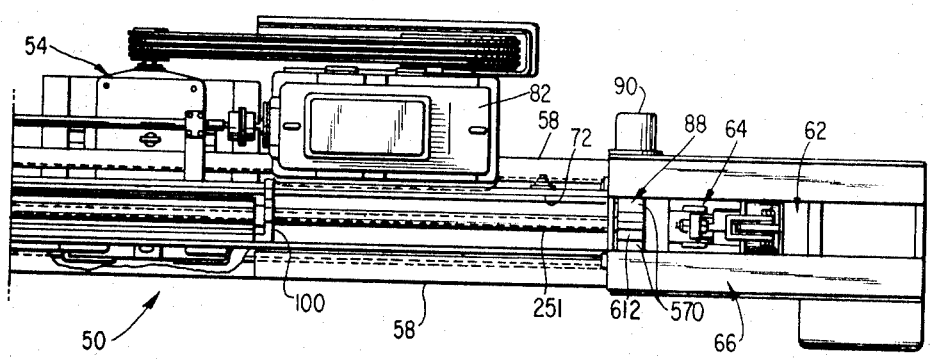

With reference to FIGS. 1 and 2, a pipe mill using the intermediate clamp assembly of this invention in conjunction with a blank feed and turning mechanism and a single mandrel end clamp will be generally described. Other components of the mill are described in detail in co-pending application Ser. No. 529. The enlarged detail drawing Figures are reproduced from working drawings and can be scaled for relative dimensions.

The pipe mill 50 disclosed in the drawings, has been used in producing thin-walled pipe with O.D. of from 8-15 mm. and includes a number of sub-assemblies supported by the mill floor 52. Main power is furnished by a plural speed, electric drive motor 54 which can be located in a well 56 under the other pipe mill components, which are supported on several heavy steel I-beams 58 resting on and secured to the mill floor. A rolling stand 62 is located at the front end (right hand end of the drawings) of the mill and, with a rocking lever assembly 64, is mounted in a front mill housing 66 in a manner enabling the rolling stand to be reciprocated back and forth by the rocking lever, as has been described in detail in the aforeidentified co-pending application.

At the left-hand end of the mill, a rear housing 68 is secured to the I-beam bed and contains feeding and turning gear mechanism 70 which is part of the drive path from motor 54 to the mandrel clamp assembly and the floating blank chuck 80. The front and rear housings 66 and 68 are rigidly secured to and provide end support for the intermediate or mill table 72 which includes a rear end brace 74 and parallel longitudinal beams 76 to which are fastened parallel channel track slideways 78 forming tracks for the "floating" blank feed chuck 80 which travels from a position adjacent the rear housing to a location adjacent the front housing in feeding a pipe blank to the rolling stand.

Between main motor 54 and front housing 66 is a third housing 82 which contains reduction and drive transfer gearing from the motor drive to the rocking lever and to the blank feed mechanism.

At the extreme rear or input end of the mill, is the single mandrel rod clamping mechanism 84 rigidly fastened to the rear wall of housing 68 by a heavy, steel cantilever support 86.

Near the front end of the mill, shown in FIG. 2, an intermediate blank clamp assembly 88 can be seen adjacent the rear end of the rolling stand housing 66.

Near the left hand portion of FIG. 1, a second drive motor 92 secured under the table on a support frame 94, is used for speeded up feed-in and return movement of the blank feed chuck 80.

One or more welded steel stands 96 provide rigid support for the table 72, and appropriate sheet metal cowling can enclose the sides of the intermediate table area. Conventional pipe blank supports 100 are used along the table to help support the mandrel spindle and the blank.

Main and auxiliary mill control panels located on the side of the table near the rear and front ends include various electrical control switches and indicator lights to operate and indicate mill condition.

The drive mechanism is best understood with reference to the aforesaid co-pending application wherein it has been described in detail. Relative to cooperation between the drive mechanism and intermediate clamp assembly 88, the drive mechanism includes a long feed screw shaft 246 and a long turning screw shaft 240, both of which extend substantially the length of the mill, between the mandrel end clamp 84 and the intermediate clamp 88. Shaft 240 is journalled near its rear end in a bearing block bracket 242 and at its front end in a bearing assembly secured in the intermediate blank clamp assembly 88, as is described hereinafter. The long, blank turning shaft 240 projects through the floating chuck assembly 80 and is slidably drive coupled thereto in a manner described in said co-pending application. The turning shaft 240 is coupled with an aligned mandrel clamp turning shaft enabling an incremental rotation of the mandrel clamp (which rotates the mandrel spindle) conjointly with turning or rotation, of the blank, as is described in said co-pending application.

The feed screw 246 is disposed directly under the axis of the pipe blank feed path and is journalled against axial movement in tapered roller thrust bearings located in the rear bearing block bracket 242 and, at its front end, in the intermediate blank clamp assembly 88. It extends through a nut member under the floating blank chuck 80 and by threaded cooperation with nut provides feed movements for the feed chuck.

The exemplary cold rolling pipe mill being described, requires a mandrel head (not shown) made from steel and shaped to conform with the desired inner diameter of the finished pipe. The mandrel head is axially maintained in a predetermined axial position disposed within the rolling stand 62. A long mandrel spindle or rod 250 (seen at the left hand end of FIGS. 1 and 2) extends from the mandrel clamp assembly 84, which securely clamps the rear end of the rod, along the feed path axis, through the floating blank chuck 80, along the length of the table 72, through the intermediate clamp 88 and into the rolling stand 62 where it is secured to and carries the mandrel head. In this mill, only one mandrel rod clamp is used. To keep the mandrel rod 250 from axially shifting when added blanks 251 are fed into the mill, this mill uses the intermediate blank clamp 88 situated directly to the rear of the rolling stand.

To initially charge the mill, (as shown in FIGS. 1 and 2) the mandrel rod end clamp 84 is opened and a first pipe blank is fed over the mandrel rod 250 clearing the mandrel end clamp 84 and up to the point where the leading end of the blank enters the rolling zone. At that stage, the mandrel end clamp assembly 84 is actuated by a hand lever 396 to securely grip the rear end of the mandrel rod. The blank feed chuck (at its rear limit position) is manually operated to grip the rear end of the pipe blank 251. The mill is then started, whereupon the roll stand 62 receives a reciprocating motion, and the blank feed chuck assembly 80 periodically feeds the pipe blank into the rolling zone.

After the feed chuck, with the first pipe blank, reaches its extreme right hand position, it will actuate and end-of-feed limit switch (not shown) and the main mill motor 54 will be stopped automatically: at this point in mill operation the intermediate blank clamp 88 is actuated to its clamped condition and the blank as well as the mandrel rod 250 and its head, which has a rather snug fit inside the blank at the rolling zone, are held against axial displacement; the blank feed chuck 476 is manually opened and, via auxiliary motor 92, is returned to its lefthand position. Next, the mandrel clamp 84 is opened, the new pipe blank is fed onto the mandrel rod and the feed and rolling process is repeated.

INTERMEDIATE BLANK CLAMP

Details of the intermediate blank clamp 88 are shown in FIGS. 3–5. Clamp 88 is assembled on a machined steel frame 570 which includes base flanges 572 and 574 secured by heavy screws to angled, longitudinal support brackets 576 and 578 rigidly secured to fixed framework between the side walls of the rolling stand housing 66 below the pipe feed path axis. Key plates 580 cooperate with accurately located key recesses in the base flanges 572, 574 and in the support brackets 576 and 578 to accurately locate and maintain the axial position of the blank clamp 88.

The large lower portion 582 of the steel frame 570 is chambered to receive a steel thrust bearing housing 584 which has an outer front end flange 586 and a stepped rear end inside flange 588 which provides a bearing abutment 590 and a recess to receive a shaft grease seal 592. Two tapered roller thrust bearing sets 594 and 596 are received in the bearing housing 588 and journal the end 598 of the feed screw 246. The end of screw 246 is threaded to receive locking nuts 600 which clamp the feed screw and bearing sets within the frame 570. A cover plate 602 is fastened to the frame 570 over the bearing housing 588 by screws and clamps the bearing housing and outer bearing races. Suitable lubricant fittings are provided to inject grease, manually or automatically, into the bearing housing.

The upper part 604 of the intermediate clamp frame 570 is apertured at 606 in a direction normal to the mill axis and serves as a clamp fork fitting as well as providing an integral upper jaw abutment 608. A steel bar, dog leg lever 610, with a short lever arm 612 and a long lever arm 614, projects through the upper frame aperture 606 and is rockably mounted on a headed axle pin 616 which passes through apertures 618 and 620 in the upper frame part 604. A cotter pin or like is used to retain the axle in assembly.

The short arm 612 of the clamp lever 610 constitutes a lower jaw abutment 622 for the clamp. In assembly, the two jaw abutments 608 and 622 are disposed adjacent each other with the pipe blank feed path axis passing between them. Each jaw carries, in semi-cylindrical recesses, a bronze half ring 624 and 626 which have locator flanges 628 fitted in end recesses in the two jaws. The half rings, secured in the jaws by screws 630, are the elements which engage the outer surface of the pipe blank and are shaped to conform to the outer circumference of the pipe blank being rolled. Accordingly, different half rings are used as determined by the size of the pipe blank being rolled.

The long lever arm 614 projects beyond the side of the rolling stand housing into the upper end of the solenoid housing 90 (see FIG. 2b), and its end is apertured at 632 enabling a coupled disposition over the shank 634 of an operator rod 636, which has a lower forked end 638 pinned to the plunger 640 of a solenoid 642 secured to the base plate 644 of housing 90.

A spring seat washer 646 and nut 648 on the end of operator rod 634 retain a heavy, coil compression spring 650 on the upper side of the apertured end of lever arm 614. A light compression coil spring 652 is disposed around the operator rod and under the end of lever arm 614, seating on a spring seat washer 654 which rests on an abutment bracket 656.

FIG. 3 shows the intermediate blank clamp 88 in its clamped condition. When the solenoid 642 is de-energized the heavy spring 650 expands to its full extent and then the light spring 652 expands to lift the lever arm 614, thereby rocking the short lower jaw lever arm 612 to an open condition. The long operating arm 614 and short clamping arm 612 provide a substantial force multiplication from the solenoid operator to the clamp jaws.

Shown in FIGS. 3 and 4, the upper clamp frame body serves as a pillow block which, with bearing cap 658 receives and clamps roller bearing sets 660 to journal the front end of the blank feed chuck turning shaft 240. A shaft seal cover plate 662 and a solid end cover plate 664 are fastened to the ends of the pillow block and, with spacers 666, clamp the bearing sets 660 in the pillow block. As with the lower body part 582, suitable lubricant fittings are provided in the pillow block structure for injecting lubrication into the end bearing chamber.

The invention may be embodied in other specific forms without departing from the spirit or essential characteristics thereof. The present embodiment is therefore to be considered in all respects as illustrative and non-restrictive, the scope of the invention being indicated by the appended claims rather than by the foregoing description, and all changes which come within the meaning and range of equivalency of the claims are therefore intended to be embraced therein.

What is desired to be claimed by United States Letters Patent is:

1. A pipe clamp assembly comprising: a fixed first assembly including a base member with rigid fixed overhanging jaw means, and having an aperture therethrough passing under said overhanging jaw means, lever pivot means passing transverse through said base member aperture and below said overhanging jaw means; a pivotable second assembly comprising an elongate member including a clamping lever means at one end and an operating lever means at the other end; shiftable jaw means carried by said clamping lever means; said elongate member being pivotable mounted on said pivot means at a position intermediate said two lever means and extending through the aperture in said base member with said shiftable jaw means below and in adjacent relationship to said fixed jaw means enabling pivotal shift between a clamping and an unclamped condition; and cooperating surface portions of both lever means and of said base member maintaining an immovable condition of said lever means relative to said base member excepting for a pivotal movement about the axis of pivot of said lever means.

2. A pipe clamp assembly as defined in claim 1, wherein said clamping lever means constitutes a short lever arm relative to the lever arm of said operating lever arm means.

3. A pipe clamp assembly comprising: a support means; a first assembly rigidly secured to said support means including a massive base member, with rigid fixed jaw means; a pivotable second assembly comprising an elongate member including a clamping lever means at one end and an operating lever means at the other end; shiftable jaw means carried by said clamping lever means; means pivotably mounting said elongate member at a position intermediate said two lever means on said base member with said two jaw means in adjacent relationship enabling pivotal shift between a clamping and an unclamped condition; cooperating surface portions of both lever means and of said base member maintaining an immovable condition of said lever means relative to said base member excepting for a pivotal movement about the axis of pivot of said lever means; an operator means mounted on said support means in fixed relationship to said first assembly and having a movable power member; and means providing a limited lost motion connection, with resilient bias in both directions of movement, between said power member and the end of said operating lever means.

4. A pipe clamp assembly as defined in claim 3, wherein said base member has an aperture made transverse to the lever pivotal axis and through which said pivotal axis passes; said two lever means comprise an integral lever and said lever is disposed through said aperture and pivoted to said base member therein; the facing portions of said two jaw means each being provided with a semi-cylindrical recess; a soft metal half ring having a complementary contour to an associated said recess is fixed in each of said recesses, each of said half rings having facing contours shaped to conform to the outer circumference of a cylindrical pipe to be clamped.

5. A pipe clamp assembly as defined in claim 4, wherein means removably secure said half rings in the facing portions of said jaw means, enabling utilization of different half rings within said jaws to accommodate and clamp various sizes of cylindrical pipe blanks.

6. A pipe clamp assembly as defined in claim 3, wherein said clamping lever means is a short lever arm relative to said operating lever means.

7. A pipe clamp assembly as defined in claim 6, wherein said long operating lever means projects transverse of said of first assembly with its end apertured and disposed offset from the side of said first assembly; said operator means constitutes a motor with a reciprocable power member and said reciprocable power member projects through the aperture in the end of said long lever means; and means, including a compression coil spring connection, interconnecting said power member and said long lever means.

8. A pipe clamp assembly as defined in claim 7, wherein said operator means is a solenoid having a reciprocable armature, a power transfer link means is pivotably connected to said armature; there is an apertured abutment means, adapted to be fixed relative to said support means, through which said link means projects and a first coil compression spring disposed over said link means and seats on said abutment means; the apertured end of said long lever means is disposed over said link means and engages the other end of said first compression coil spring; a second compression coil spring is disposed over the end of said link means and seats on said long lever means on the opposite side from said first spring; and clamp means secured to the end of said link means provides the second abutment seat for said second compression coil spring.

9. A pipe clamp assembly as defined in claim 6, wherein said two lever means are integral with the short lever means extending in one direction from the pivot axis and the long lever means extending in the other direction from the pivot axis; said base member is steel and has member support flanges adapted to be rigidly secured to said support means, said massive member has an enlarged opening therein along an axis disposed parallel to said pivot axis and under said two jaw means; means are provided within said opening for receiving and fastening a first thrust bearing assembly for the end of a rotating shaft; and means are provided above and offset to one side of said pivot axis for securing an additional bearing means for the end of a rotating shaft.

10. A pipe clamp assembly as defined in claim 6, wherein said base member has an aperture made transverse to the lever pivotal axis and through which said pivotal axis passes; said elongate member is disposed through said aperture and pivoted to said base member therein; spaced apart side surfaces of said aperture and adjacent side surfaces on said elongate member being disposed with a close sliding side surface fit to accurately maintain said elongate member against shifting movement axially of the axis of said pivotably mounting means relative to said base member.

11. A pipe clamp assembly as defined in claim 10, wherein the facing portions of said two jaw means are each provided with a semi-cylindrical recess; a soft metal half ring having a complementary contour to an associated said recess is fixed in each of said recesses, each of said half rings having facing contours shaped to conform to the outer circumference of a cylindrical pipe to be clamped.

12. A pipe clamp assembly as defined in claim 6, wherein said base member is steel and has member support flanges adapted to be rigidly secured to said support means; said base member includes means for receiving and maintaining a thrust bearing assembly for the end of a rotating shaft thereby providing a combination clamp and thrust bearing assembly.

13. For use in combination with a pipe mill, which has a roll stand at one end, to roll pipe from a pipe blank which passes over an axially fixed mandrel rod and mandrel as it progresses through the roll stand working zone; a releasable mandrel rod end clamp; means to feed the pipe blank; and an intermediate pipe blank clamp secured to the mill frame at the entrance to the working zone; said blank clamp comprising: a first assembly rigidly secured on said mill frame including fixed jaw means; a pivotable second assembly with a short lever means including shiftable jaw means and a long operating lever means, means pivotably mounting the fulcrum of said two lever means of said second assembly on said first assembly with said two jaw means in adjacent relationship enabling relative pivotal shift between a clamped and unclamped condition, an operator means secured to a fixed portion of the mill frame adjacent said first assembly having a movable power member, and means providing a limited lost motion connection, with resilient bias in both directions of movement, between said power member and the end of said long operating lever means.

14. In a pipe mill combination as defined in claim 13, said first assembly comprising: a massive steel member having support flanges by which said clamp is rigidly secured to the mill frame and containing an enlarged opening along an axis disposed parallel to the lever pivot axis under said two jaw means; and means disposed within said opening for receiving and fastening a first bearing assembly for the end of a mill operating shaft.

15. In a pipe mill combination as defined in claim 14, said steel member further including retaining means offset from said pivot axis for securing an additional mill operating shaft end bearing assembly.

* * * * *